US009529653B2

(12) United States Patent
Bose et al.

(10) Patent No.: US 9,529,653 B2
(45) Date of Patent: Dec. 27, 2016

(54) PROCESSOR REGISTER ERROR CORRECTION MANAGEMENT

(71) Applicant: International Business Machines Corporation, Armonk, NY (US)

(72) Inventors: Pradip Bose, Yorktown Heights, NY (US); Chen-Yong Cher, Port Chester, NY (US); Meeta S. Gupta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 14/510,350

(22) Filed: Oct. 9, 2014

(65) Prior Publication Data

US 2016/0103736 A1  Apr. 14, 2016

(51) Int. Cl.
*G06F 11/00* (2006.01)
*G06F 11/07* (2006.01)
*G06F 11/20* (2006.01)

(52) U.S. Cl.
CPC ......... *G06F 11/073* (2013.01); *G06F 11/0721* (2013.01); *G06F 11/0793* (2013.01); *G06F 11/20* (2013.01)

(58) Field of Classification Search
USPC .......................................................... 714/30
See application file for complete search history.

(56) References Cited

U.S. PATENT DOCUMENTS

| 7,512,772 | B2 | 3/2009 | Gschwind et al. | |
|---|---|---|---|---|
| 7,739,576 | B2 | 6/2010 | Radke | |
| 2003/0120903 | A1* | 6/2003 | Roussel | G06F 9/30032 712/221 |
| 2004/0034845 | A1* | 2/2004 | Okada | G06F 8/4451 717/100 |
| 2008/0072120 | A1 | 3/2008 | Radke | |
| 2011/0161945 | A1* | 6/2011 | Kalogeropulos | G06F 8/441 717/152 |
| 2012/0011348 | A1* | 1/2012 | Eichenberger | G06F 9/30032 712/222 |
| 2013/0073838 | A1* | 3/2013 | Gschwind | G06F 9/30025 712/226 |

OTHER PUBLICATIONS

Alameldeen et al., "Energy-Efficient Cache Design Using Variable-Strength Error-Correcting Codes", Proceedings of the 38th Annual International Symposium on Computer Architecture, Jun. 2011, pp. 461-472, Copyright 2011 ACM, New York, NY DOI: 10.1145/2000064.2000118.

(Continued)

*Primary Examiner* — Sarai Butler
(74) *Attorney, Agent, or Firm* — Jay Wahlquist

(57) ABSTRACT

Processor register protection management is disclosed. In embodiments, a method of processor register protection management can include determining a sensitive logical register for executable code generated by a compiler, generating an error-correction table identifying the sensitive logical register, and storing the error-correction table in a memory accessible by a processor. The processor can be configured to generate a duplicate register of the sensitive logical register identified by the error-correction table.

23 Claims, 10 Drawing Sheets

(56) References Cited

OTHER PUBLICATIONS

Cher et al., "Soft Error Resiliency Characterization and Improvement on IBM BlueGene/Q Processor Using Accelerated Proton Irradiation", Workshop on Silicon Errors in Logis-System Effects (SELSE), 2013.
Fu et al., "Exploring Event Correlation for Failure Prediction in Coalitions of Clusters", Proceedings of the 2007 ACM/IEEE Conference on Supercomputing, Nov. 2007, Copyright 2007 ACM, New York, NY DOI: 10.1145/1362622.1362678.
Kellington et al., "IBM® POWER6™ Processor Soft Error Tolerance Analysis Using Proton Irradiation", Workshop on Silicon Errors in Logic-System Effects (SELSE), 2007.
Kudva et al., "Fault Injection Verification of IBM POWER6 Soft Error Resilience", Workshop on Architectural Support for Gigascale Integration, 2007.
Li et al., "MAGE: Adaptive Granularity and ECC for Resilient and Power Efficient Memory Systems", 2012 Proceedings of the International Conference on High Performance Computing, Networking, Storage and Analysis (SC), Nov. 2012, pp. 33:1-33:11, © 2012 IEEE. DOI: 10.1109/SC.2012.73.
Lin et al., "SECRET: Selective Error Correction for Refresh Energy reducTion in DRAMs", 2012 IEEE 30th International Conference on Computer Design (ICCD), Sep.-Oct. 2012, pp. 67-74, © 2012 IEEE DOI: 10.1109/ICCD.2012.6378619.
Liu et al., "Flikker: Saving DRAM Refresh-power through Critical Data Partitioning", Proceedings of the 16th International Conference on Architectural Support for Programming Languages and Operating Systems (ASPLOS), Mar. 2011, pp. 213-224, vol. 39, Issue 1, © 2011 ACM, New York, NY DOI: 10.1145/1961295. 1950391.
Loveless et al., "Neutron- and Proton-Induced Single Event Upsets for D- and DICE-Flip/Flop Designs at a 40 nm Technology Node", IEEE Transactions on Nuclear Science, vol. 58, No. 3, Jun. 2011, pp. 1008-1014, © 2011 IEEE. DOI: 10.1109/TNS.2011.2123918.
Michalak et al., "Assessment of the Impact of Cosmic-Ray-Induced Neutrons on Hardware in the Roadrunner Supercomputer", IEEE Transactions on Device and Materials Reliability, vol. 12, No. 2, Jun. 2012, pp. 445-454, © 2012 IEEE. DOI: 10.1109/TDMR.2012. 2192736.
Oldiges et al., "Technologies to further reduce soft error susceptibility in SOI", 2009 IEEE International Electron Devices Meeting (IEDM), Dec. 2009, 4 pages, © 2009 IEEE. DOI: 10.1109/IEDM. 2009.5424338.
Qin et al., "SafeMem: Exploiting ECC-Memory for Detecting Memory Leaks and Memory Corruption During Production Runs", Proceedings of the 11th International Symposium on High-Performance Computer Architecture (HPCA-11 2005), Feb. 2005, pp. 291-302, © 2005 IEEE DOI: 10.1109/HPCA.2005.29.
Rodbell et al., "32 and 45 nm Radiation-Hardened-by-Design (RHBD) SOI Latches", IEEE Transactions on Nuclear Science, vol. 58, No. 6, Dec. 2011, pp. 2702-2710, © 2011 IEEE. DOI: 10.1109/ TNS.2011.2171715.

* cited by examiner

| Error Correction Code Information 502 | | | Register Renaming Information 512 |
|---|---|---|---|
| Logical Register Number 504 | Parity Protection Flag 506 | Duplicate Protection Flag 508 | Location of Duplicated Register 510 | Physical Register Location 514 |
| 1 | Yes | Yes | 3 | 4 |
| 2 | Yes | Yes | 6 | 7 |
| 5 | Yes | No | - | 10 |

FIG. 5

PROCESSOR REGISTER ERROR CORRECTION MANAGEMENT

STATEMENT REGARDING FEDERALLY SPONSORED RESEARCH OR DEVELOPMENT

This invention was made with Government support under B599858 awarded by the Department of Energy. The Government has certain rights to this invention.

BACKGROUND

The present disclosure relates to processor register protection, and more specifically, to processor error protection for sensitive registers.

Computer systems can encounter performance and reliability issues as a result of background radiation. Exposure to background radiation can cause soft error bit flips within processor registers and other computer components. Soft error bit flips can result in unrecoverable errors, system failure, computation errors, or other types of errors within the computer system.

SUMMARY

According to embodiments of the present disclosure, a method of processor register protection management is disclosed. The method can include determining a sensitive logical register for executable code generated by a compiler, generating an error-correction table identifying the sensitive logical register, and storing the error-correction table in a memory accessible by a processor. The processor can be configured to generate a duplicate register of the sensitive logical register identified by the error-correction table.

Embodiments of the present disclosure are directed towards a system for processor register protection management. The system can include a memory and a processor. The memory can store an error-correction table identifying a sensitive logical register for executable code generated by a compiler. The processor can include a plurality of registers, the processor can be configured to access the error-correction table in the memory and generate a duplicate register for the sensitive logical register identified by the error-correction table.

Embodiments of the present disclosure are directed towards a method of processor register protection management. The method can include determining a floating point logical register for executable code generated by a compiler. The floating point logical register can be configured to store a floating point including a signage bit, a plurality of exponent bits, and a plurality of fraction bits. The plurality of fraction bits can include a higher order bit and a lower order bit. The method can include generating a plurality of parity bits for the floating point logical register. The plurality of parity bits can correspond to the signage bit, the plurality of exponent bits, and the higher order bit.

Embodiments of the present disclosure are directed towards a computer program product for processor register protection management. The computer program product can include a computer readable storage medium having program instructions embodied therewith. The program instructions can be executable by a computer to cause the computer to perform a method. The method can include determining a sensitive logical register for executable code generated by a compiler, generating an error-correction table identifying the sensitive logical register, and storing the error-correction table in a memory accessible by a processor. The processor can be configured to generate a duplicate register of the sensitive logical register identified by the error-correction table.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 depicts an error-correction table including sensitive logical registers, according to embodiments of the present disclosure.

Figure 1:
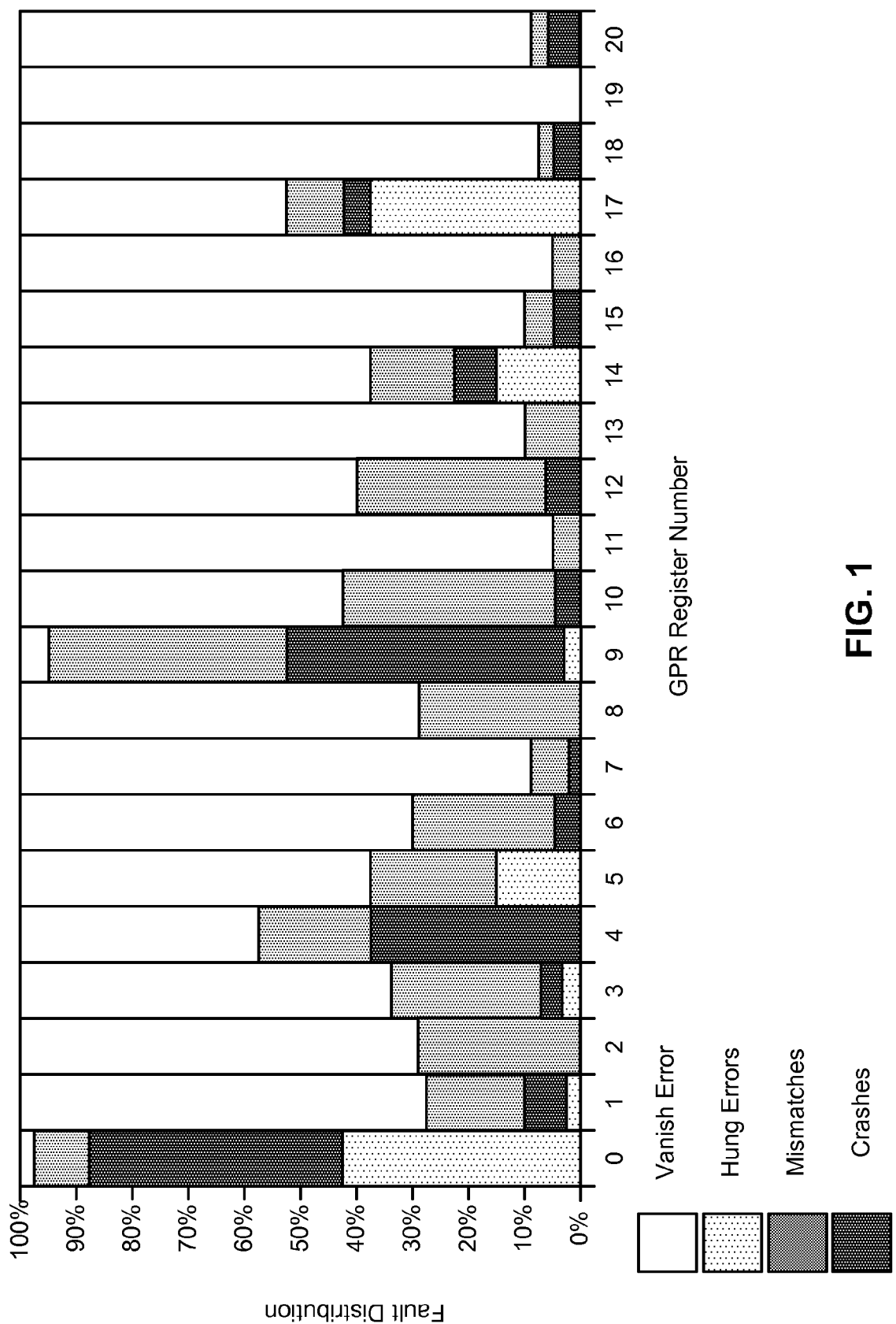
FIG. 1 depicts a fault distribution graph for general purpose registers generated from fault injection analysis, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to processor register protection management, more particular aspects relate to selective register protection for soft error failures. While the present disclosure is not necessarily limited to such applications, various aspects of the disclosure may be appreciated through a discussion of various examples using this context.

While various numbers may be used to identify same named elements within disclosure, this practice is not intended to limit the scope of the disclosure. Identified elements in one figure may be the same or substantially similar to other same named elements in other figures.

Embodiments of the present disclosure are directed to a system for processor register protection management. Computer systems can encounter performance and reliability issues as a result of background radiation from alpha particles, cosmic rays, or other types of radiation. For example, background radiation can deposit a charge within one or more computer components and, if the deposited charge is sufficiently large, a non-conducting component (such as a transistor) can become inadvertently conducting. This change in conductivity can result in an unwarranted bit flips within components in the system. These unwarranted bit flips are called soft errors. Soft errors generally do not damage hardware, but can result in unrecoverable errors, system failure, computation errors, or other types of errors within the computer system.

When a soft error occurs, it can be categorized as recoverable or unrecoverable. A recoverable error may have no impact in the system other than temporary performance degradation. However, if the soft error is unrecoverable, it can lead to a check-stop (no forward progress) in the form of a hang, a partition outage, a system outage, or other error. Unrecoverable soft errors can be referred to herein as "soft error failures" or "failures".

Error detection and correction code (ECC) can be utilized within computer systems to detect and correct soft errors in order to prevent issues arising from bit flips. ECC can take various forms within the system. In embodiments, the system could use parity protection as a form of ECC. In embodiments, the system could use duplication protection as a form of ECC. In certain embodiments, the system can use horizontal redundancy checks, vertical redundancy checks, and double, dual or diagonal parity, or other suitable types of ECC schemes.

Processors can employ ECC protection to reduce soft error failures in the processor's registers. The processor can use various forms of ECC protection as described herein. However, if the processor uses ECC protection for a relatively large number of registers, the use of ECC can increase processor resource usage and can increase response latency for the ECC. For example, in some instances by employing duplication protection in all registers within a processor can increase resource usage approximately 13% to 50%. Thus, limiting ECC protection to registers which are particularly sensitive to soft errors can allow for a level of protection against soft errors in the processor while improving resource efficiency in the processor.

Embodiments of the present disclosure are directed toward a system configured to determine sensitive logical registers associated with a compiler. Described further herein, sensitive registers are logical registers which experience a high number of soft errors failures, relative to other logical registers. The difference in soft error failures can be due to the kind of functions associated with each logical register, as certain functions can be more sensitive to soft error failures than other functions. For example, soft errors in a logical register which functions as a stack pointer can lead to a crash or an error by moving the stack to some other point in computation. Similarly, soft errors in a logical register used as a pointer for Table of Content (TOC) of the current running routine can cause the application to load values from an incorrect location. Similarly, soft errors in a floating point register can, depending on the bit flipped, result in significant changes to the value of a float point number stored in the register.

The compiler can associate particular functions with various logical registers. For example, the software's compiler could associate a first logical register with a stack pointer function, a second logical register as a pointer for TOC, and a third logical register as a floating point register. In embodiments, for the sake of binary interfacing, standardization, and other factors, each application generated by that compiler could have the first, second and third logical register associated with the functions described. Thus, applications generated by the compiler can share sensitive logical registers.

In embodiments, the system can identify sensitive logical registers by determining whether a logical register has a soft error failure rate which triggers a threshold failure rate. If the failure rate for a logical register is outside of the threshold failure rate, the system can identify the logical register as a sensitive logical register. For example, in embodiments the threshold failure rate could be selected as a 55% failure rate. The system could identify logical registers that have a failure rate greater than 55% as a sensitive logical registers.

Additionally, in embodiments, the system can employ selective floating point register protection. Described further herein, floating point registers can include multiple components which make up the floating point value stored in the floating point register. Certain components of the floating point register can be particularly sensitive to bit flips. Thus, the system could employ ECC protection for those sensitive floating point components.

In embodiments, the system can access an error-correction table which identifies the sensitive logical registers associated with a particular compiler. In embodiments, the error-correction table can identify the sensitive logical registers associate with a particular application binary interface. For example, the system could determine sensitive logical registers for an application generated by a first compiler. The error-correction table can be stored in memory and accessed by a processor when the processor executes an application generated by the first compiler. Described further herein, the processor can be configured to provide ECC protection to registers identified as sensitive in the error-correction table.

In certain embodiments, the system can access a floating-point table which identifies the logical registers which function as floating point registers associated with a particular compiler. The floating point table can be stored in memory and accessed by a processor when the processor executes an application generated by the compiler. The system could be configured to provide ECC protection to certain components of the floating point number stored in the floating point registers.

In embodiments, the ECC protection can include providing parity protection and duplication protection to sensitive logical registers. Parity protection can include associating one or more parity bits to the end of a string of bits in a register. The added parity bit can be used to determine whether the value of the string of bits associated with the parity bit has encountered a bit flip. In embodiments, the parity bit can be configured to change value to indicate whether the string of bits was originally odd or even. The parity bit can be referenced to determine whether the string of bits experienced a bit flip. For example if a bit flip changed the value of the string of bits from an even number to odd number, the discrepancy with the associated parity bit can show the processor that a soft error occurred in the string of bits.

Duplication protection can include generating copies of strings of bits within duplication registers. The duplication registers can be referenced by the processor in the event of soft error bit flips to return the string of bits to a previously correct value.

Referring now to FIG. 1, an example bar graph diagram can be seen depicting an example of general purpose register (GPR) failure rates. The failure rates reported in FIG. 1 can be obtained using fault injection experiments within the register space to generate bit flips in the GPRs when entering a code segment of an application generated by a particular compiler. The bit flips can lead to various recoverable and unrecoverable soft error outcomes including, but not limited to vanish errors, mismatches, hung errors, and crashes.

Vanish errors include errors where the bit flip has no effect on the final program output. In the disclosure, the term vanished can be used interchangeably with the term "Masked". Mismatched errors include errors where the injected bit-flip results in a mismatch in the program output when compared to a fault-free "golden" run. Mismatches include errors where the injected bit-flip results in a mismatch in the program output. However, the application's built-in algorithm determines that the obtained solution is within tolerable range of the desired solution. Crashes include errors where the injected error results in the termination of the program due to a detected runtime error (e.g. divide-by-zero error, segmentation fault, or other runtime error). Hung errors include errors where the injected bit-flip results in a "hung" state, where there is no forward progress of the program execution. In embodiments, a soft error failure occurs in the register when a soft error is either a vanish error, mismatch error, hung error, or a crash.

As seen in FIG. 1, some registers have relatively higher failure rates (hung errors, mismatches, crashes) than other registers. For example, GPR 0, 4, and 9 have relatively high failure rates, each greater than 55%.

These results can be explained with regard to the logical registers associated with GPR 0, 4, and 9 and the functions of those logical registers. For example, the logical register associated with GPR 0 could function as a stack pointer. As described herein, corruption of the stack pointer can lead to a crash or an error by changing a pointer vale to point to an incorrect address. Similarly, the logical register associated with GPR 4 could function as a pointer for Table of Content (TOC) of the current running routine to locate its variables. As described herein, a corrupted TOC can cause the execution to continuously load values from incorrect locations of variables. The logical register associated with GPR 9 could function as the preferred register in a compiler stack-based register allocation algorithm among global variable registers. The logical register associated with GPR 9 could be mostly used for reads and mostly into load instructions. Thus, a bit flip in the value of GPR 9 could lead to corruption of the load address.

In embodiments, these registers could be identified as sensitive logical registers. In embodiments, the system could determine whether logical registers are sensitive logical registers by comparing the failure rate for each logical register to a threshold failure rate. The system could identify each logical register with a failure rate outside of the threshold failure rate as a sensitive logical register. The threshold failure rate can be selected as various values depending upon the preferences of a user. For example, the threshold failure rate could be selected as 55%. Because GPR 0, 4, and 9 have a failure rate outside of the 55% threshold failure rate the system could identify the logical registers associated with GPR 0, 4, and 9 as sensitive logical registers.

In certain embodiments, the registers could be pre-identified as sensitive logical registers. The compiler could be programmed to identify sensitive logical registers in code generated by the compiler.

In embodiments, the system can generate an error-correction table that identifies the sensitive logical registers. In certain embodiments, the system can receive the error-correction table from an application generated by the compiler. Described further herein, the system could then store the error-correction table in memory to be accessed by a processor. The error correction table is described further herein.

Figure 2:
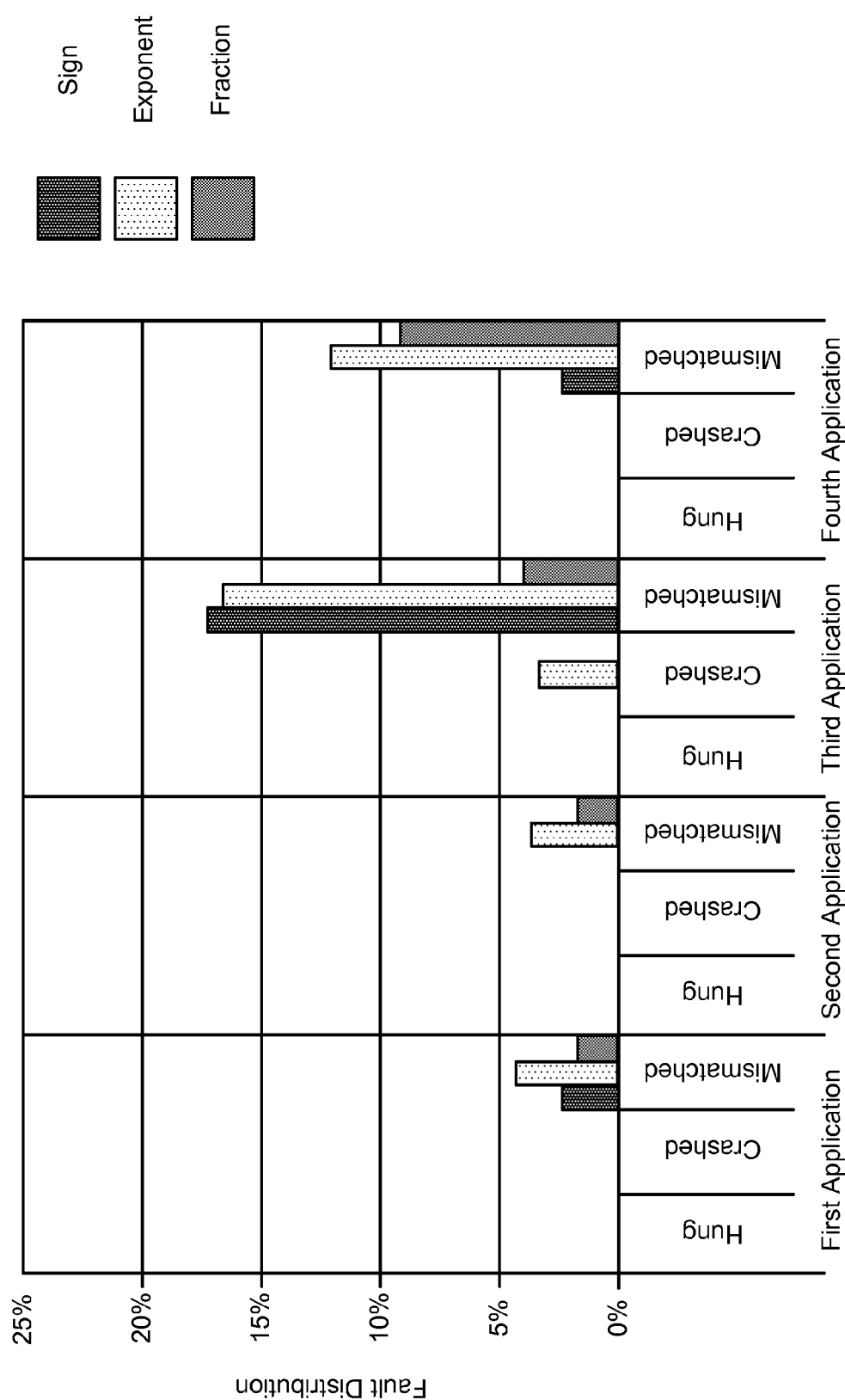
FIG. 2 depicts a fault distribution graph for floating point registers generated by fault injection analysis, according to embodiments of the present disclosure.

Referring now to FIG. 2, an example fault distribution graph is shown for floating point registers. In addition to sensitive logical registers, components of floating point data within registers can be sensitive to soft errors. As depicted in FIG. 2, a computer system running various applications was tested using fault injection techniques, as described herein, to generate soft error bit flips in floating point registers in the computer system. Shown in FIG. 2, the fault injection analysis was performed in a computer system running various applications. In FIG. 2 example error rates are shown for generic applications including a first application, second application, third application, and a fourth application. In embodiments, various applications, depending upon the preferences of a user can be tested using fault injection analysis as described herein.

The fault distribution graph shows the failure rates for each application where fault injection caused bit flips in certain portions of the floating point number. Each application has soft error failure rates for crashes, hung failures, and mismatches. Bars are used to show where the bit flip occurred in the floating point number which resulted in the soft error failure. For example, as seen in FIG. 2, for the third application, bit flips in an exponent component of the floating point number had a mismatch failure rate of about 16% percent.

The failure rates do not account for how probable it is that sign, exponent or fraction bits could be flipped, which would depend on the number of bits for each portion and how they are computed. The failure rate represents the probability of failures given that a bit flip is injected into each portion of the floating point number (sign, exponent, or fraction).

In FIG. 2 each application uses floating point number in IEEE 754 double-precision binary floating point format. In certain embodiments, other suitable floating point formats could be used. IEEE 754 includes a 64-bit numerical representation of a floating point number. The 64-bits include 1-bit allocated for a sign component, 11-bits for an exponent component, and 52-bits allocation for a fraction component.

Although the sign and exponent components have fewer bits than the 52-bit fraction portion, they can have a more significant impact if flipped. For example, bit flip in the exponent component of the floating point number can significantly increase or decrease the magnitude of the floating point value. A bit flip in the signage component can change the direction of the represented number.

The 52-bit fraction component, although larger in bit count, can have a less significant impact because only a few bits in the 52-bit fraction represent significant numbers (referred to herein as a "higher order fraction component"). However, when the significant bits are affected, they can significantly increase or decrease the value of the floating point number. In embodiments, the significant bit can be identified by the position of the bits in the fraction component. For example, depending on whether the floating point number is represented according to big endian or little endian, the system can look to the leftmost or rightmost bits to identify the most significant bits in the fraction component.

As seen in FIG. 2, the tested applications show that the signage and exponent bits are more vulnerable. A large number of soft error failures in FIG. 2 occur due to bit flips in the exponent component and sign component. Further, as described herein the higher order bits in the fraction component can also result in a significant impact if flipped. Thus, failure rates for bit flips within floating point registers could be reduced by ECC protection within the sign component, exponent component, and a higher order fraction component.

Described further herein, a floating-point table could be generated which identifies floating point registers to a system. The system could be configured to identify floating point registers by accessing the floating-point table and employ ECC protection to the sign component, exponent component, and the higher order fraction component.

Figure 3:
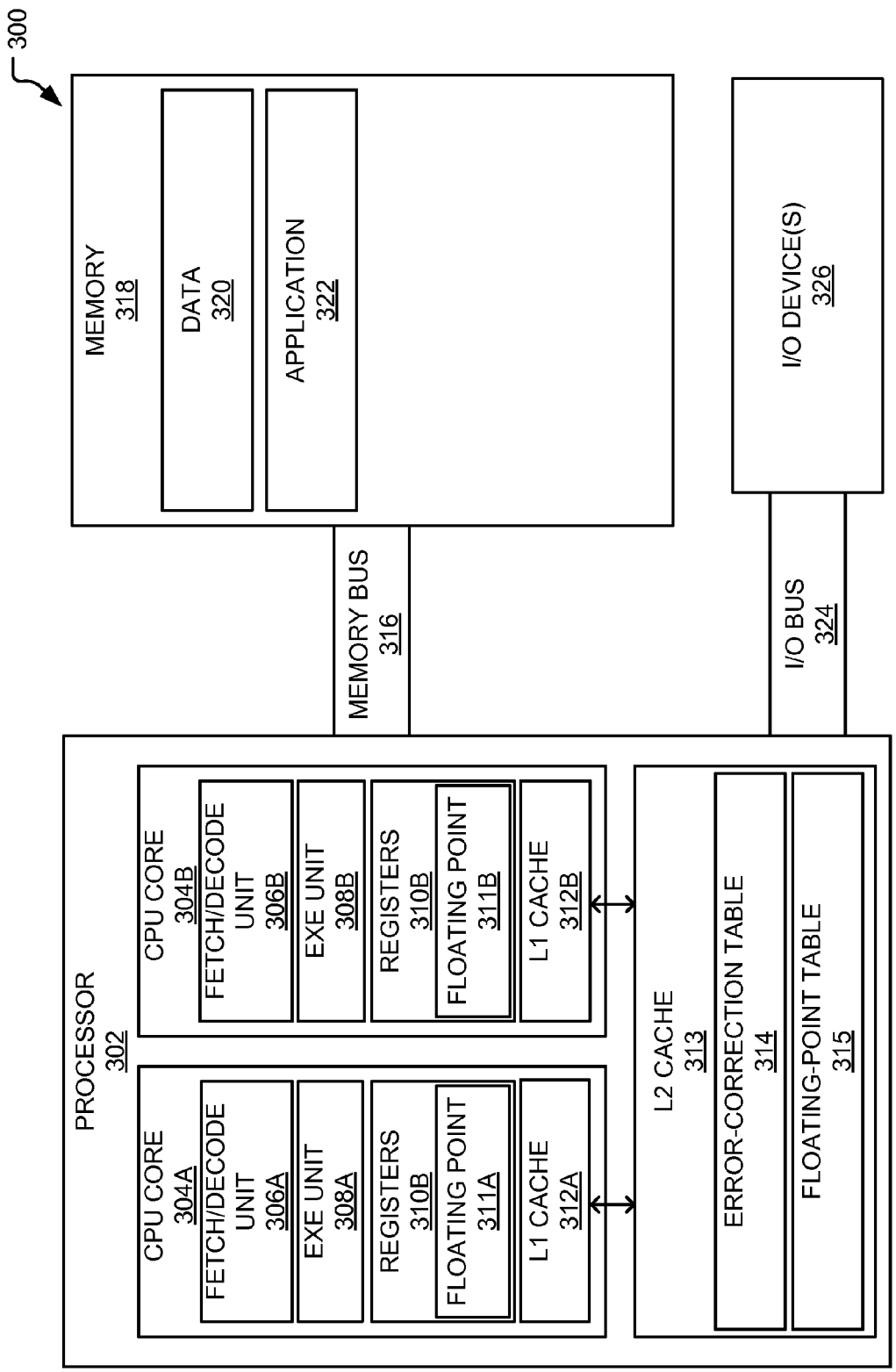
FIG. 3 depicts a computer system for processor register protection management, according to embodiments of the present disclosure.

Referring now to FIG. 3 a computer system 300 for processor register protection management can be seen according to embodiments of the present disclosure. In embodiments, the computer system 300 can include a processor 302, memory 318, and I/O (input/output) devices 326.

The processor 302 can execute instructions stored in memory 318 and perform various functions in the computer processing system 300. The processor 302 can include CPU cores 304A, 304B. In embodiments, the processor 302 can contain a plurality of CPU cores. In certain embodiments the processor 302 can contain a single CPU core. Each of the CPU cores 304A, 304B can include fetch/decode units 306A, 306B, execution units 308A, 308B, registers 310A, 310B, and L1 cache 312A, 312B. The CPU cores 304A, 304B, using the fetch/decode units 306A, 306B and the execution units 308A, 308B, can retrieve and execute instructions from memory 318 to provide logic functions for the processor 302. The registers 310A, 310B and L1 cache 312A, 312B can provide storage for data that is frequently accessed in each CPU core 304A, 304B. The processor 302 can include L2 cache 313. The L2 cache 313 can be communicatively connected to each of the CPU cores 304A, 304B and can provide shared storage for data in the processor 302.

The registers 310A, 310B can include floating point register 311A, 311B. The floating point registers 311A, 311B are logical registers which function as storage for floating point values in execution of an application 322. The assigned function for logical registers as floating point registers 311A, 311B can be determined by a particular compiler for an application 220, as described herein.

In embodiments, an error-correction table 314 for logical registers can be stored in memory internal to the processor 302. Described further herein, the error-correction table 314 can list sensitive logical registers for applications generated by a particular compiler. When entering a code segment from an application generated by the particular compiler, the processor 302 can access the error-correction table 314 to determine which registers should have ECC protection. In embodiments, the processor 302 can be configured to access the error-correction table 314 in response to a signal from the application. The processor 302 can employ ECC protection such as duplication protection, parity protection, and/or other suitable ECC protection for the sensitive logical registers in the error-correction table 314.

For example, the error-correction table 314 could be associated with an application 322 generated by a first compiler. In response to a code segment of the application 322, the processor 302 can access the error-correction table 322 from the L2 cache 313. The processor 302 could identify from error-correction table 314 that logical registers 0, 4, and 9 are sensitive registers. In response, the processor 302 could then employ duplication protection for those logical registers.

Described further herein, the error-correction table 314 can also include instructions for the type of ECC the processor 302 should employ for each register. For example, the error-correction table 314 can list that logical register 1 should have duplication protection and parity protection enabled and that logical register 3 should have parity protection enabled. In response to accessing the error-correction table 314, the processor 302 can employ the ECC protection listed in the error-correction table 314.

In certain embodiments, the error-correction table can be stored in L1 cache 312A, 312B in one or more of the CPU cores 304A, 304B. The processor 302 can be configured to access the error-correction table 314, in response to entering a code segment of an application 320, from L1 cache 312A, 312B, or from other storage internal to the processor 302.

The compiler for the application 322 can generate a floating-point table 315 associated with application 322. The floating-point table 315 can identify the logical registers which are assigned to function as floating point registers for the application 322. When entering a code segment from the application 322, the floating point table 315 can be stored in memory within the computer system 300. For example, in embodiments, the floating point table can be stored in memory internal to the processor such as in L2 cache 313. Stored in L2 cache 315, the floating-point table can be relatively quickly accessed by each CPU core 304A, 304B. In certain embodiments, the floating-point table 315 can be stored in L1 cache 312A, 312B. The processor 302 can be configured to access the floating-point table 315 to determine which logical registers are floating point registers. In embodiments, the error-correction table 314 and floating-point table 315 can be specific to one or more of the CPU cores 304A, 304B. In certain embodiments, the error-correction table 314 and floating-point table 315 can be specific to individual threads in the processor 302. Described further herein, in embodiments, the error-correction table 314 and floating-point table 315 can be stored in memory 318 external to processor 302.

In embodiments, the processor can be configured to employ ECC protection, such as parity protection and/or duplication protection to components of the floating point registers. For example, the processor 302 could be configured to provide parity protection to the sign component, exponent component, and the higher order fraction component. In certain embodiments, the processor 302 could be configured to provide duplication protection to the sign component, exponent component, and the higher order fraction component. In embodiments, the floating-point table 321 can be included within the error-correction table 500 (FIG. 5), as described herein.

In embodiments, the computer system 300 can contain multiple processors 302 typical of a relatively large system. In certain embodiments, the computer system 300 can be a single processor system. The processor 302 can be various types of processors including, but not limited to digital signal processor (DSP) hardware, network processor, application specific integrated circuit (ASIC), field programmable gate array (FPGA), or other types of processors. The memory 318 can be coupled to the processor 302 via a memory bus 316.

The memory 318 can include a random-access semiconductor memory, storage device, or storage medium (either volatile or non-volatile) for storing or encoding data and programs. The memory 318 can be conceptually a single monolithic entity, but in other embodiments the memory 318 can be a more complex arrangement, such as a hierarchy of caches and other memory devices. The memory 318 can store data, instructions, modules, and other types of information, hereafter collectively referred to as "memory elements." Although the memory elements are illustrated as being contained within the memory 318, in certain embodiments some or all of them can be on different devices and can be accessed remotely, e.g., via a network.

The computer system 300 can use virtual addressing mechanisms that allow the programs of the computer system 300 to behave as if they only have access to a large, single storage entity instead of access to multiple, smaller storage entities. Thus, while the memory elements are illustrated as being contained within the memory 318, these elements are not necessarily completely contained in the same storage device at the same time. Further, although the memory elements are illustrated as being separate entities, in other embodiments some of them, portions of some of them, or all of them can be packaged together.

In embodiments, the memory elements can include data 320 and application 322. The memory elements can be instructions or statements that execute in the processor 302 to carry out embodiments of the present disclosure. In embodiments the data 320 can be various types of data stored in memory 316. For example, in embodiments the data 320 could include the error-correction table 314 containing registers identified for duplication protection. Similarly, in embodiments, the data could include the floating-point table 315 containing logical registers identified as floating point registers. The processor 302 can be configured to access the error-correction table 314 and/or the floating-point table 315 stored in data 320 to determine whether ECC protection should be applied to certain logical registers, as described herein. Application 322 can be an application generated by a compiler as described herein.

The processor 302 can also communicate with one or more I/O devices 326 via an I/O bus 324. The I/O devices 326 can include, but are not limited to, devices such as a keyboard, a pointing device, a display, one or more devices that enable a user to interact with the computer system 300, and various devices (e.g., network interface card, modem, etc.) that enable the computer system 300 to communicate with one or more other computing devices. For example, the I/O devices 326 can include a graphics processing unit (GPU) including GPU cores, execution units, registers, and cache. It should be understood that other suitable hardware and software components can be used in conjunction with the computer system 300.

Figure 4:
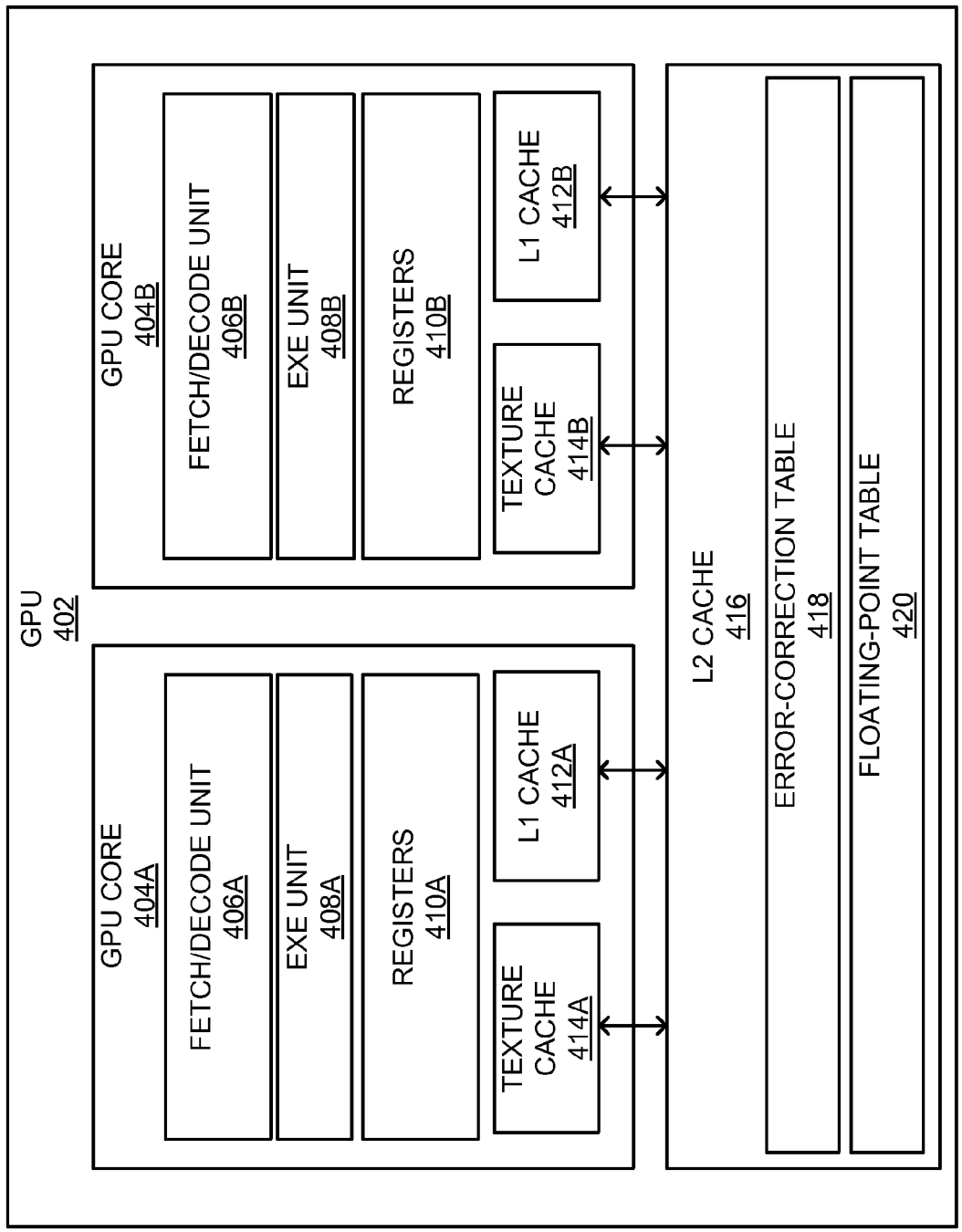
FIG. 4 depicts a graphical processing unit for processor register protection management, according to embodiments of the present disclosure.

Referring now to FIG. 4 a GPU 402 can be seen according to embodiments of the present disclosure. The GPU 402 can execute instructions stored in memory 318 (FIG. 3) and perform various functions in a computer system. The GPU 402 can include GPU cores 404A, 404B. In embodiments, the GPU 402 can contain a plurality of GPU cores. In certain embodiments the GPU 402 can contain a single GPU core. Each of the GPU cores 404A, 404B can include fetch/decode units 406A, 406B, execution units 408A, 408B, registers 410A, 410B, L1 cache 412A, 412B, and texture cache 414. The GPU cores 404A, 404B, using the fetch/decode units 406A, 406B and the execution units 408A, 408B, can retrieve and execute instructions from memory 318 (FIG. 3) to provide logic functions for the GPU 402. The registers 410A, 410B and L1 cache 412A, 412B and texture cache 414A, 414B can provide storage for data that is frequently accessed in each GPU core 404A, 404B. The GPU 402 can include L2 cache 416. The L2 cache 416 can be communicatively connected to each of the GPU cores 404A, 404B and can provide shared storage for data in the GPU 402.

In embodiments, an error-correction table 418 for logical registers can be stored in memory internal to the GPU 402. The error-correction table 418 can list sensitive logical registers for applications generated by a particular compiler. As described in reference to FIG. 3, when entering a code segment from an application, the GPU 402 can access the error-correction table 418 to determine which logical registers should have ECC employed.

Similarly, in embodiments a floating-point table 420 can be stored in memory internal to the GPU 402. The floating-point table 420 can list floating point registers for applications generated by the particular compiler. As described in reference to FIG. 3, when entering a code segment from an application, the GPU can access the floating-point table 420 to determine which logical registers should have ECC employed.

Referring now to FIG. 5 an error-correction table 500 can be seen according to embodiments of the present disclosure. In embodiments, the compiler can provide the error-correction table 500 to a computer system as a list of sensitive logical registers with associated ECC protection requirements. The error-correction table 500 can include ECC information 502 and register renaming information 512.

The ECC information 502 can include a logical register number 504, a parity protection enable flag 506, a duplication protection enable flag 508 and a location of duplicated register 510. The logical register number 504 can be used to identify the logical registers in the error correction table 500. For example, in FIG. 5 the logical register number 504 lists three registers, logical register 1, logical register 2, and logical register 5. The entries in the error-correction table 500 which follow the logical register number 504 entries are associated with those logical registers.

The parity protection enable flag 506 identifies whether parity protection should be enabled for the identified logical registers in the error-correction table 500. The duplicate protection enable flag 508 identifies whether duplication protection should be enabled for the identified logical register in the error-correction table 500. In FIG. 5, the error-correction table 500 contains ECC instructions for parity protection (via the parity protection flag 506 and the duplicate protection flag 508). In certain embodiments, the error-correction table 500 can include ECC instructions for other types of ECC protection such as horizontal redundancy checks, vertical redundancy checks, and double, dual or diagonal parity, or other suitable types of ECC schemes.

As described herein, a processor 302 (FIG. 3) can access the error-correction table 500 and detect ECC requirements for listed logical registers. For example, the processor could detect that the logical register 1 has the parity protection flag 506 and the duplicate protection flag enabled 508. In response, the processor could enable duplicate protection and parity protection in logical register 1. Additionally the processor could detect that the logical register 5 has the parity protection flag 506 enabled but the duplication protection flag 508 disabled. In response, the processor could enable parity protection in logical register 5.

The location of the duplicated register 510 identifies the physical register used for the duplicate of the associated logical register. For example in FIG. 5, logical register 1 has the duplicate protection flag 508 enabled. Location of duplicated register 510 identifies that physical register 3 contains the duplicate of logical register 1. In embodiments, the duplicate register can be stored in a memory location external to the processor. For example, in embodiments the duplicate register could be stored in memory 318 (FIG. 3).

The location of the duplicated register 510 can be predetermined in the error-correction table 500 by the compiler or determined by the processor. In embodiments, the processor can read and write data from the error-correction table 500. The processor can receive the instruction to use duplication protection for logical register 1 from the table 500 and duplicate it in a physical register. The processor can select an available physical register for the duplicate and write the location of the duplicated register in the table 500.

In certain embodiments, the error-correction table 500 can include a preselected location of duplicated register 510 that instructs the processor to create the duplicate logical register at a particular location. For example, the processor could access the location of duplicated register 510 and receive an instruction to duplicate logical register 1 in physical register 3.

The register renaming information 512 can include a physical register number 514. The renamed register number 514 can identify the physical location of a renamed register associated with the logical register in the error-correction table 500. On physical register allocation for the renamed register, the renamed register inherits the same flags in error correction code information 502 as the corresponding logical register entry. For example, logical register 2 has a renamed register with a physical register location 514 in physical register 7. When physical register is retired, the error-correction table entry is also retired and the sensitive logical register can be removed from the error-correction table 500.

In embodiments, the system can be configured to determine that a renamed register is generated from a logical register, determine whether the logical register is identified by the error-correction table 500 and modify the error-correction table 500 to identify the renamed register in response to determining that the logical register is identified by the error-correction table 500.

Figure 6:
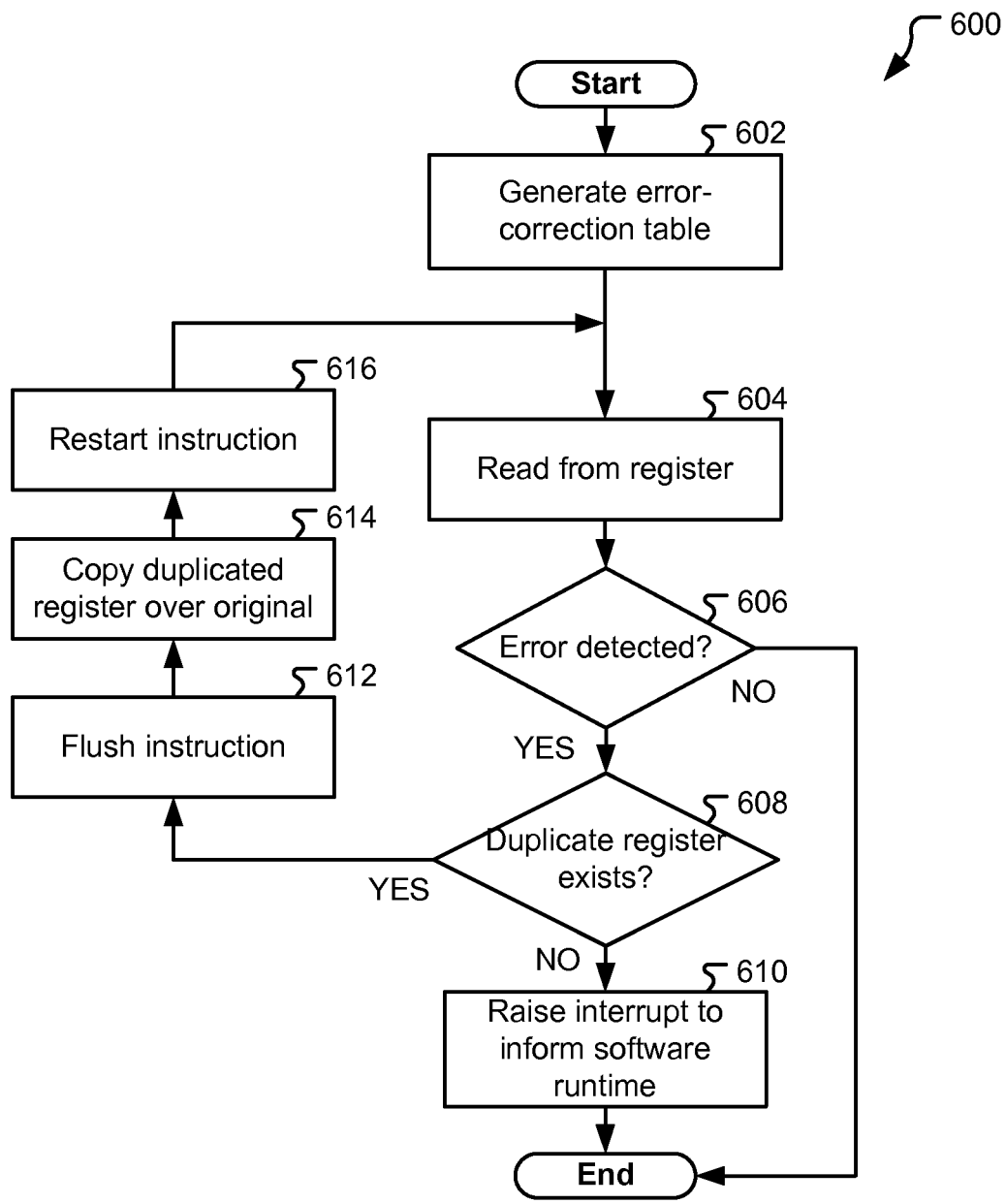
FIG. 6 depicts a flowchart diagram of a method of processor register protection management while executing a read instruction, according to embodiments of the present disclosure.

Referring now to FIG. 6, a flowchart diagram of a method 600 of processor register management for a read instruction can be seen according to embodiments of the present disclosure. In operation 602, a compiler can generate an error-correction table. The error-correction table can be created using fault injection analysis as described herein. Logical registers can be analyzed to determine whether soft errors result in a failure rate outside of a threshold failure rate, as described herein. In certain embodiments, a computer system could be configured to determine the error-correction table.

In embodiments, static analysis of the compiler could be used to determine whether logical registers for the compiler are sensitive based on the assigned function for the logical register. For example, it could be determined that logical registers which function as a Table of Content (TOC) pointer are sensitive logical registers. Static analysis of the code in the compiler could determine which logical register functions as a TOC pointer. In response, the logical register could then be identified in the error-correction table.

In operation 604, a read instruction can be performed for a register in a processor. If a soft error is detected in the register, then in decision block 606, the method 600 can progress to decision block 608. In embodiments, the error can be detected by use of parity bit protection, as described herein.

In decision block 608, the processor can reference the error-correction table to determine whether a duplicate register exists. If no duplicate register exists, then in decision block 608 the method 600 can progress to operation 610 and the system can raise an interrupt to inform software in runtime that an error occurred in the register.

If a duplicate register exists, then in decision block 608, the method 600 can progress to operation 612. In operation 612, the method 600 can flush the read instruction and progress to operation 614 where the method 600 can copy/overwrite the duplicated register over the original logical register. In operation 616, the method 600 can restart the instruction and progress to 604 to begin the read instruction again.

Figure 7:
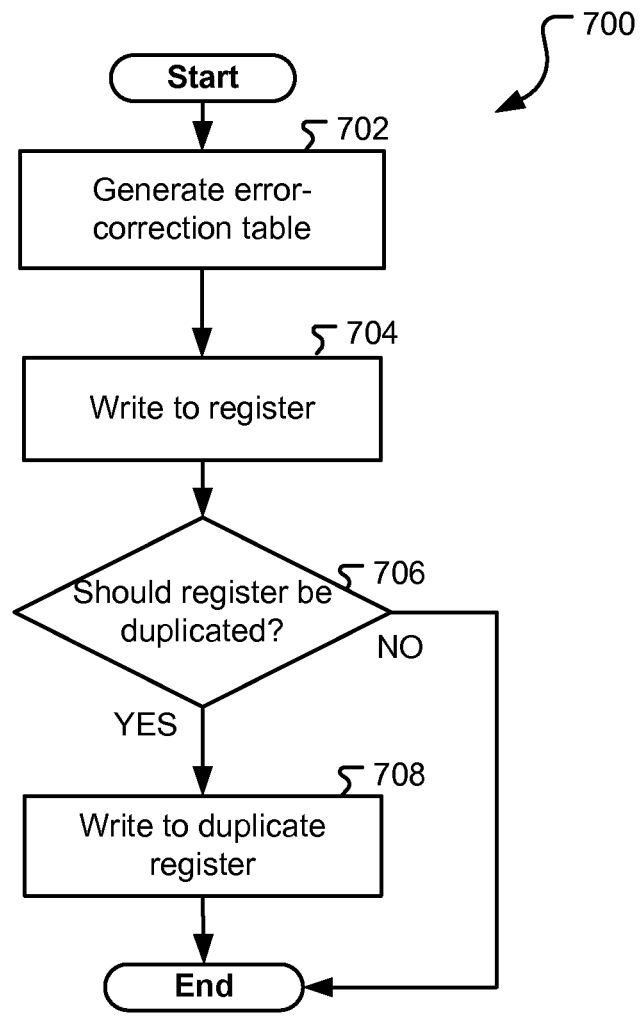
FIG. 7 depicts a flowchart diagram of a method of processor register protection management while executing a write instruction according to embodiments of the present disclosure.

Referring now to FIG. 7, a flowchart diagram of a method 700 of processor register management for a write instruction can be seen according to embodiments of the present disclosure. In operation 702, a compiler can generate an error-correction table. The error-correction table can be the same or substantially similar as described herein. In operation 704, the processor can receive a write instruction to write to a register in the processor. In response to the write instruction, the processor can determine whether the register should be duplicated in decision block 706. As described herein, the processor can access the error-correction table to determine whether the register that is the subject of the write instruction should be duplicated. The processor can determine whether the error-correction table includes a duplication flag enabling duplication protection for the register.

If the register is identified as requiring duplication protection in the error-correction table, then in decision block 706, the method 700 can progress to operation 708. In operation 708 the method 700 can write a duplicate register. As described herein, in embodiments, the processor can determine the physical location of the duplicate register. In certain embodiments, the processor can determine the physical location for the duplicate register from preselected values in the error-correction table. If the register is not identified in the error-correction table, then in decision block 706 the method 700 can terminate without creating the duplicate register.

Figure 8:
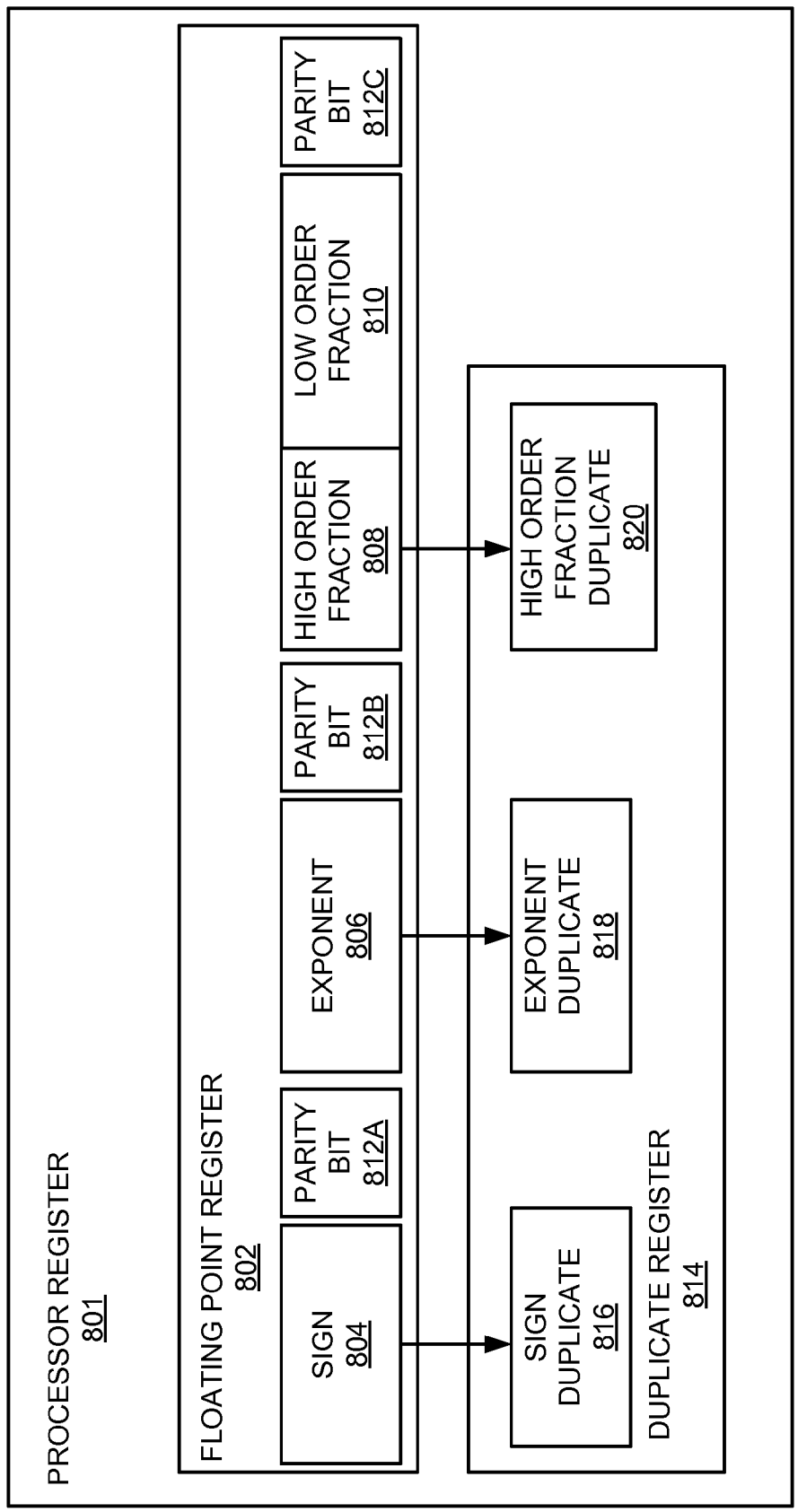
FIG. 8 depicts a processor register including a floating point register and duplicate register, according to embodiments of the present disclosure.

Referring now to FIG. 8, a processor register 801 including a floating point register 802 and a duplicate register 814 can be seen according to embodiments of the present disclosure. The processor register 801 can be the same or substantially similar as registers 310A, 310B (FIG. 3). The processor register 801 can include a floating point register 802. The floating point register 802 can be a physical register within a computer system 300 (FIG. 3) which is assigned to a logical register, which functions as storage for a floating point value, in the execution of an application.

The floating point register 802 can include multiple components of a floating point number including a sign component 804, an exponent component 806, and a fraction component 808, 810. The fraction component can include a higher order fraction 808 and a lower order fraction 810. In embodiments, the floating point register 802 can also include parity bits 812A-812C. Parity bits 812A-812C can be associated with each of the floating point components. For example a first parity bit 812A could be associated with the sign component 804, a second parity 812B bit could be associated with the exponent component 806 and a third parity bit 812C could be associated with the higher order fraction component 808. As described herein, the parity bits 812 can be included in the floating point register 802 as a part of ECC from a processor 302 (FIG. 3). The parity bits 812A-812C can be used to determine whether an error has occurred in the component of the floating point number which the parity bit is assigned. For example, the first parity bit 812A could be used to determine whether an error has occurred in the sign component 804. Similarly, the second parity bit 812B could be used to determine whether an error has occurred in the exponent component 806 and the third parity bit 812C could be used to determine whether an error has occurred in the higher order fraction component 808.

The duplicate register 814 can be used to store duplicates of the floating point register 802. In embodiments, the processor 802 could employ duplication protection for floating point components which are relatively vulnerable to soft error failures, as described herein. As discussed, the sign component 804, exponent component 806, and the higher order fraction 808 are relatively vulnerable components of the floating point number. Thus, in embodiments, the processor can use ECC duplication protection to generate copies of the sign component 816, exponent component 818, and high order component 820 in the duplicate register 814.

In embodiments, the processor can access the duplicates 816-820 in response to detecting an error in the floating point register 802. For example, the processor could detect that a bit flip has occurred in the sign portion 804 of the floating point using the first parity bit 812A. In response, the processor could and read the sign component copy 816 from the duplicate register 814 and write the value of the sign component copy 816 over the sign component 804. The processor could then restart the current instruction and resume reading from the floating point register 802.

Figure 9:
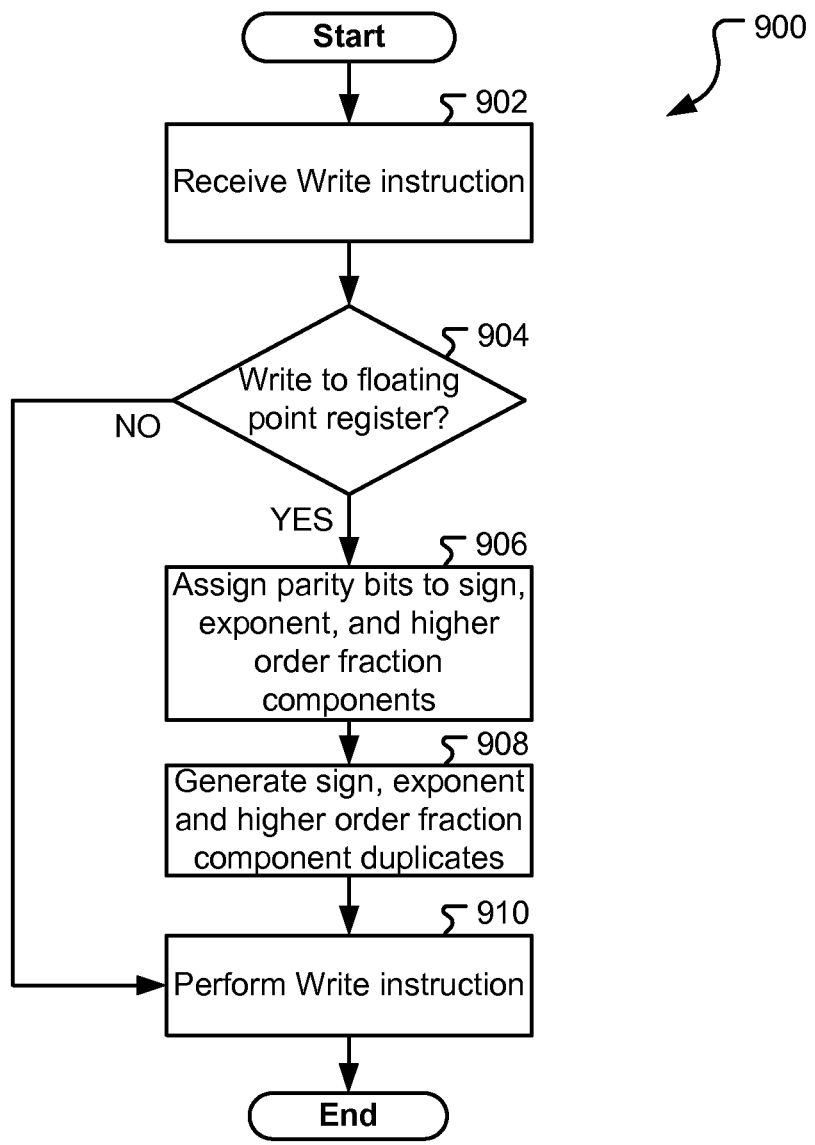
FIG. 9 depicts a flowchart diagram of a method of processor register management while executing a write instruction, according to embodiments of the present disclosure.

Referring now to FIG. 9, a flowchart diagram of a method 900 of processor register management can be seen according to embodiments of the present disclosure. In operation 902, a processor can receive a write instruction to write data to a register. In embodiments, as a part of the write instruction, the processor can reference a floating-point table stored in memory to determine whether the register is a floating point register. The floating-point table can be the same or substantially similar as described herein. If the register is a floating point register, then in decision block 904, the method 900 can progress to operation 906. In embodiments, the processor can be configured to assign ECC protection to relatively vulnerable bits within the floating point number. As described herein, a sign component, exponent component, and a higher order component of the floating point number can be relatively vulnerable in the floating point number. Thus, the processor can be configured to assign those components with duplication and/or parity protection.

In operation 906, the processor can assign parity bits to the sign component, exponent component and the higher order fraction component of the floating point number. For example a first parity bit can be assigned to the sign component. A second parity bit can be assigned to the exponent component and a third parity bit can be assigned to the higher order fraction component. As described herein, the parity bits can be used to determine when one or more of the components in the floating point number experiences a bit flip.

In operation 908, the method 900 can generate duplicates of the relatively sensitive bits. As described herein, the processor can create duplicates of the sign component, exponent component and higher order fraction component as a part of ECC protection in the floating point register. In operation 910, the method 900 can perform the write instruction and the method 900 can end.

If the register is not a floating point register, then in decision block 904, the method 900 can progress directly to operation 910 where the method 900 can perform the write instruction and terminate without applying ECC for floating point registers.

Figure 10:
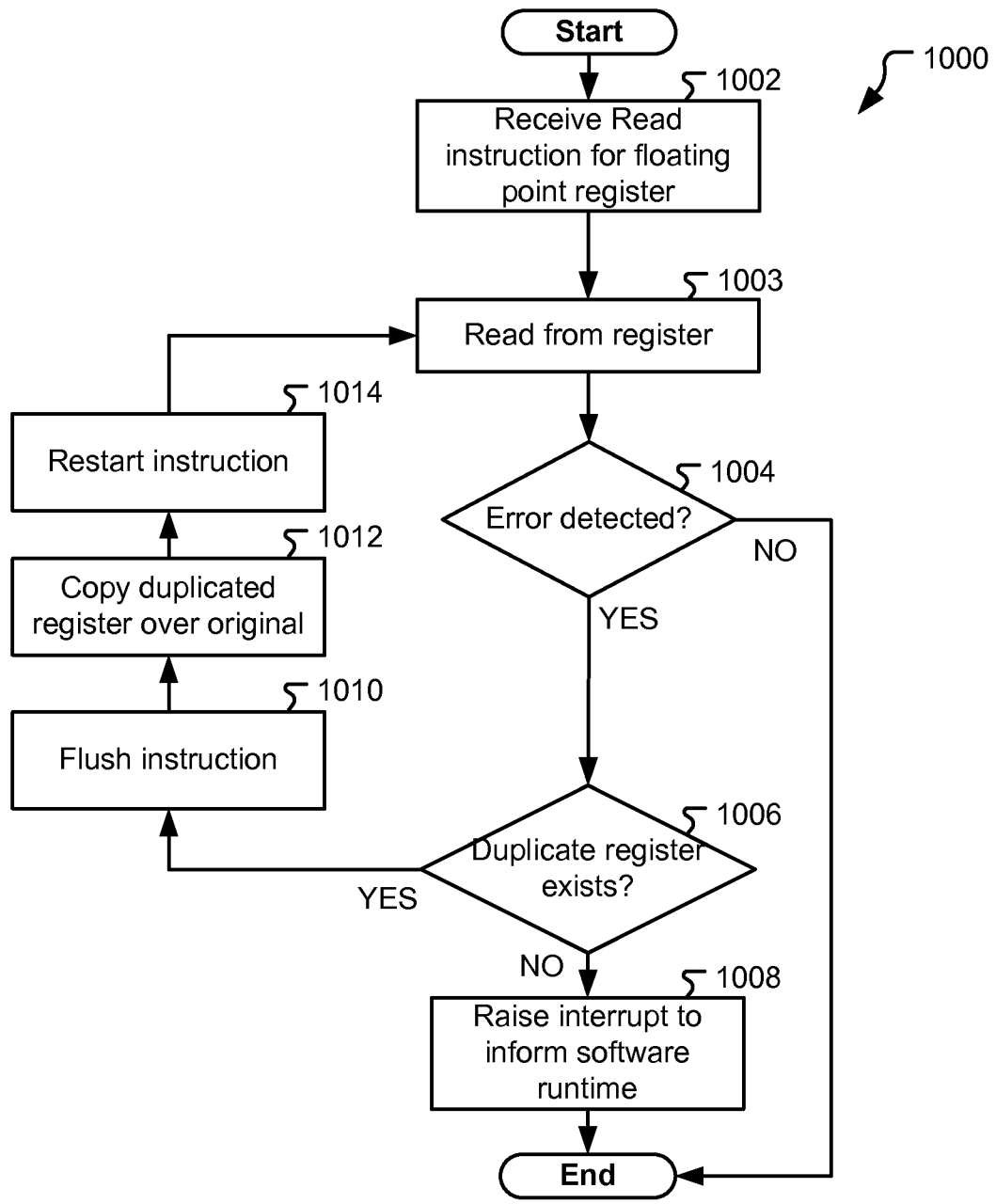
FIG. 10 depicts a flowchart diagram of a method of processor register management while executing a read instruction, according to embodiments of the present disclosure.

Referring now to FIG. 10, a flowchart diagram of a method 1000 of processor register management can be seen according to embodiments of the present disclosure. In operation 1002, a computer system can receive a read instruction for a floating point register. As described herein, a processor performing the read instruction can be configured to reference a floating-point table to determine whether the register is a floating point register. In operation 1003, the system can perform the read instruction for the register. If an error is detected in the floating point register then, in decision block 1004, the method 1000 can progress to decision block 1004.

If a duplication of the floating point register component is determined to exist then, in decision block 1006 the method 1000 can progress to operation 1010. If no duplicate register exists, then in decision block 1006 the method 1000 can progress to operation 1008 and the system can raise an interrupt to inform software in runtime that an error occurred in the register.

If a duplicate register exists, then in decision block 1006, the method 1000 can progress to operation 1010. In operation 1010, the system can flush the read instruction and progress to operation 1012 where the method 1000 can copy/overwrite the duplicated components of the floating point register over the original floating point register. In operation 1014, the method 1100 can restart the instruction and progress to 1003 to begin the read instruction again.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of processor register protection management, the method comprising:
   determining a sensitive logical register for executable code generated by a compiler;
   generating an error-correction table identifying the sensitive logical register; and
   storing the error-correction table in a memory accessible by a processor, wherein the processor is configured to generate a duplicate register of the sensitive logical register identified by the error-correction table.

2. The method of claim 1, further comprising:
   receiving a register write instruction for a logical register;
   determining whether the logical register is identified by the error-correction table in response to receiving the register write instruction; and
   writing a data duplicate of the logical register in a memory location in response to determining that the logical register is in the error-correction table.

3. The method of claim 1, further comprising:
   receiving a read instruction for a logical register;
   determining whether an error exists in the logical register
   determining whether a data duplicate of the logical register exists, in response to determining than an error exists in the register; and
   overwriting the logical register with the data duplicate.

4. The method of claim 1, wherein the sensitive logical register for executable code generated by the compiler is determined using an error injection analysis.

5. The method of claim 1, wherein the sensitive logical register for executable code generated by the compiler is determined using static analysis.

6. The method of claim 1, wherein the memory is located within the processor.

7. The method of claim 1, wherein the memory is located external to the processor.

8. The method of claim 1, further comprising:
determining that a renamed register is generated from a logical register;
determining whether the logical register is identified by the error-correction table
modifying the error-correction table to identify the renamed register in response to determining that the logical register is identified by the error-correction table.

9. A system for processor register protection management, the system comprising:
a memory storing an error-correction table identifying a sensitive logical register for executable code generated by a compiler; and
a processor having a plurality of registers, the processor configured to access the error-correction table in the memory and generate a duplicate register for the sensitive logical register identified by the error-correction table.

10. The system of claim 9, wherein the processor is further configured to:
receive a register write instruction for a logical register;
determine whether the logical register is identified by the error-correction table in response to receiving the register write instruction; and
write a data duplicate of the logical register in a physical register in response to determining that the logical register is in the error-correction table.

11. The system of claim 9, wherein the processor is further configured to:
receive a read instruction for a logical register;
determine whether an error exists in the logical register
determine whether a data duplicate of the logical register exists, in response to determining than an error exists in the register; and
overwrite the logical register with the data duplicate.

12. The system of claim 9, wherein the sensitive logical register for executable code generated by the compiler is determined using an error injection analysis.

13. The system of claim 9, wherein the sensitive logical register for executable code generated by the compiler is determined using static analysis.

14. The system of claim 9, wherein the memory is located within the processor.

15. The system of claim 9, wherein the memory is located external to the processor.

16. The system of claim 9, wherein the processor is further configured to:
determine that a renamed register is generated from a logical register;
determine whether the logical register is identified by the error-correction table; and
modify the error-correction table to identify the renamed register in response to determining that the logical register is identified by the error-correction table.

17. A method of processor register protection management, the method comprising:
determining a floating point logical register for executable code generated by a compiler, the floating point logical register configured to store a floating point including a signage bit, a plurality of exponent bits, and a plurality of fraction bits, the plurality of fraction bits including a higher order bit and a lower order bit;
generating a plurality of parity bits for the floating point logical register, the plurality of parity bits corresponding to the signage bit, the plurality of exponent bits, and the higher order bit.

18. The method of claim 17, further comprising:
determining a sensitive logical register for executable code generated by a compiler;
generating an error-correction table identifying the sensitive logical register; and
storing the error-correction table in a memory accessible by a processor, wherein the processor is configured to generate a duplicate register the sensitive logical register identified by the error-correction table.

19. The method of claim 18, further comprising:
receiving a register write instruction for a logical register;
determining whether the logical register is identified by the error-correction table in response to receiving the register write instruction; and
writing a data duplicate of the logical register in a physical register in response to determining that the logical register is in the error-correction table.

20. The method of claim 18, further comprising:
receiving a read instruction for a logical register;
determining whether an error exists in the logical register
determining whether a data duplicate of the logical register exists, in response to determining than an error exists in the register; and
overwriting the logical register with the data duplicate.

21. A computer program product for processor register protection management, the computer program product comprising a computer readable storage medium having program instructions embodied therewith, the program instructions executable by a computer to cause the computer to perform a method comprising:
determining a sensitive logical register for executable code generated by a compiler;
generating an error-correction table identifying the sensitive logical register; and
storing the error-correction table in a memory accessible by a processor, wherein the processor is configured to generate a duplicate register of the sensitive logical register identified by the error-correction table.

22. The computer program product of claim 21, wherein the program instructions cause the computer to perform the method, the method further comprising:
receiving a register write instruction for a logical register;
determining whether the logical register is identified by the error-correction table in response to receiving the register write instruction; and
writing a data duplicate of the logical register in a physical register in response to determining that the logical register is in the error-correction table.

23. The computer program product of claim 21, wherein the program instructions cause the computer to perform the method, the method further comprising:
receiving a read instruction for a logical register;
determining whether an error exists in the logical register
determining whether a data duplicate of the logical register exists, in response to determining than an error exists in the register; and
overwriting the logical register with the data duplicate;

determining a floating point logical register for executable code generated by a compiler, the floating point logical register configured to store a floating point including a signage bit, a plurality of exponent bits, and a plurality of fraction bits, the plurality of fraction bits including a higher order bit and a lower order bit;

generating a plurality of parity bits for the floating point logical register, the plurality of parity bits corresponding to the signage bit, the plurality of exponent bits, and the higher order bit.

* * * * *